(12) United States Patent
Mann

(10) Patent No.: US 12,188,560 B2
(45) Date of Patent: Jan. 7, 2025

(54) THERMAL BARRIER SEALING SYSTEM AND METHOD

(71) Applicant: Atlas Copco Mafi-Trench Company LLC, Santa Maria, CA (US)

(72) Inventor: Louis Mann, Santa Maria, CA (US)

(73) Assignee: ATLAS COPCO MAFI-TRENCH COMPANY LLC, Santa Maria, CA (US)

( * ) Notice: Subject to any disclaimer, the term of this patent is extended or adjusted under 35 U.S.C. 154(b) by 0 days.

(21) Appl. No.: 18/119,877

(22) Filed: Mar. 10, 2023

(65) Prior Publication Data

US 2023/0287978 A1    Sep. 14, 2023

Related U.S. Application Data

(60) Provisional application No. 63/319,013, filed on Mar. 11, 2022.

(51) Int. Cl.
*F16J 15/16* (2006.01)
*F01D 11/00* (2006.01)
(Continued)

(52) U.S. Cl.
CPC .......... *F16J 15/164* (2013.01); *F01D 11/025* (2013.01); *F01D 11/06* (2013.01); *F16J 15/40* (2013.01);
(Continued)

(58) Field of Classification Search
CPC combination set(s) only.
See application file for complete search history.

(56) References Cited

U.S. PATENT DOCUMENTS

| 3,831,381 A | 8/1974 | Swearingen |
| 4,477,223 A | 10/1984 | Giroux |

(Continued)

FOREIGN PATENT DOCUMENTS

| CN | 210890112 U | 6/2020 |
| WO | 2013163045 A1 | 10/2013 |

(Continued)

OTHER PUBLICATIONS

Avetian, Tadeh—Addressing High Sub-Synchronous Vibrations in a Turboexpander Equipped With Active Magnetic Bearings; Turbomachinery Laboratory, Texas A&M Engineering Experiment Station; 48th Turbomachinery & 35th Pump Symposia—Sep. 9-12, 2019.

(Continued)

*Primary Examiner* — Binh Q Tran
(74) *Attorney, Agent, or Firm* — Schmeiser, Olsen & Watts LLP

(57) ABSTRACT

Sealing gas systems and related methods are provided. The sealing gas system includes a machine having a first end, a bearing carrier, and a shaft seal vent, wherein the machine receives a sealing gas flow; and at least one processor, wherein the at least one processor includes or is in communication with a temperature controller for detecting a temperature of a vent gas flow at the shaft seal vent; wherein the at least one processor and/or the temperature controller are configured to detect a process gas flow through the shaft seal vent based on the detected temperature of the vent gas flow at the shaft seal vent.

20 Claims, 9 Drawing Sheets

(51) Int. Cl.
| | | |
|---|---|---|
| *F01D 11/02* | (2006.01) | |
| *F01D 11/06* | (2006.01) | |
| *F01D 11/08* | (2006.01) | |
| *F01D 17/08* | (2006.01) | |
| *F01D 21/12* | (2006.01) | |
| *F04D 29/08* | (2006.01) | |
| *F04D 29/10* | (2006.01) | |
| *F16J 15/40* | (2006.01) | |

(52) U.S. Cl.
CPC ............ *F01D 11/005* (2013.01); *F01D 11/08* (2013.01); *F01D 17/085* (2013.01); *F01D 21/12* (2013.01); *F04D 29/08* (2013.01); *F04D 29/10* (2013.01)

(56) References Cited

U.S. PATENT DOCUMENTS

| | | | |
|---|---|---|---|
| 4,606,652 A | 8/1986 | Swearingen | |
| 5,147,015 A * | 9/1992 | Snuttjer | F16N 39/02 184/104.1 |
| 5,649,425 A | 7/1997 | Matsumura et al. | |
| 5,762,342 A * | 6/1998 | Kakabaker | F16J 15/346 277/306 |
| 6,626,436 B2 * | 9/2003 | Pecht | F16J 15/3492 277/318 |
| 7,553,568 B2 | 6/2009 | Keefer | |
| 7,938,874 B2 | 5/2011 | Auber | |
| 8,082,939 B2 | 12/2011 | Sears et al. | |
| 8,381,544 B2 | 2/2013 | Coyle | |
| 8,906,138 B2 | 12/2014 | Rasmussen et al. | |
| 8,944,746 B2 | 2/2015 | Mariotti et al. | |
| 9,476,314 B2 | 10/2016 | Besson et al. | |
| 10,082,063 B2 | 9/2018 | Beutel et al. | |
| 10,337,779 B2 | 7/2019 | Watanabe et al. | |
| 10,677,255 B2 | 6/2020 | Baldassarre et al. | |
| 10,738,711 B2 | 8/2020 | Della-Fera et al. | |
| 2009/0260388 A1 | 10/2009 | Nakazeki et al. | |
| 2009/0290971 A1 * | 11/2009 | Shamseldin | F04D 29/124 415/118 |
| 2010/0251766 A1 | 10/2010 | Rauch et al. | |
| 2011/0308300 A1 | 12/2011 | Bandaru et al. | |
| 2013/0209944 A1 | 8/2013 | Deng | |
| 2016/0058969 A1 | 3/2016 | Winter et al. | |
| 2017/0292611 A1 * | 10/2017 | Tanju | F04D 29/06 |
| 2018/0280654 A1 | 10/2018 | Borrello | |
| 2019/0063257 A1 | 2/2019 | Fioravanti et al. | |
| 2019/0309765 A1 * | 10/2019 | Garceau | F04D 27/02 |
| 2020/0200273 A1 | 6/2020 | Bergmann et al. | |
| 2021/0262481 A1 * | 8/2021 | Kasatani | G01M 3/2853 |

FOREIGN PATENT DOCUMENTS

| | | |
|---|---|---|
| WO | 2014165053 A1 | 10/2014 |
| WO | 2021173124 A1 | 9/2021 |

OTHER PUBLICATIONS

Simms, James—Fundamentals of Turboexpanders "Basic Theory and Design"; Simms Machinery International, Inc., Sep. 16, 2015.
Sapphire Technologies 2021—Freespin In-Line Turboexpander for Nature Gas and Hydrogen Applications.
Brun, Klaus—Compression Machinery for Oil and Gas; Gulf Professional Publishing; © 2019 Elsevier Inc.
Ershaghi, Behrooz—Protecting magnetic bearings from external factors and process contamination; https://www.turbomachinerymag.com/view/vibration-monitoring-education; Mar. 15, 2014.
Hydrocarbon Turboexpanders; Company: mtc-mafi trench corporation (Atlas Copco) Link: https://dokumen.tips/documents/turbo-expander-56206890c8a2f.html; 106 pgs.
Ershaghi, Behrooz—Protecting magnetic bearings from external factors and process contaminations (Case Study); 41st Turbomachinery Symposium; Sep. 24-27, 2012.
PCT International Search Report and Written Opinion of International Searching Authority mailed Jun. 7, 2023 corresponding to PCT International Application No. PCT/US23/14942 filed Mar. 10, 2023.

* cited by examiner

THERMAL BARRIER SEALING SYSTEM AND METHOD

CROSS-REFERENCE TO RELATED APPLICATIONS

This application is a non-provisional application of and claims priority to U.S. Provisional Application No. 63/319,013, filed Mar. 11, 2022, and entitled "THERMAL BARRIER SEALING SYSTEM AND METHOD."

FIELD OF TECHNOLOGY

The subject matter disclosed herein relates generally to sealing systems, for example for turbomachinery. More particularly, the subject matter relates to methods of controlling and/or minimizing process gas leakage flow using a thermal barrier sealing system. The sealing system and related systems and methods may be used, for example, for cryogenic turbomachines and may prevent warm gas flow to the process side as well as minimize process gas flow to the vent. Thus, embodiments may minimize process gas leakage to a negligible level.

BACKGROUND

Machines such as radial inflow turboexpanders and centrifugal compressors in industrial gas applications are equipped with a shaft seal vent. Venting to atmosphere or other pressurized source is typical in such configurations. The shaft seal vent gas may contain process gas as well as sealing gas from a bearing carrier. However, for applications such as pure hydrogen liquefiers with deep cryogenic temperatures, the venting of the process gas or contamination with warm sealing gas results in high process loss and thermal degradation. For example, hydrogen liquefaction and hydrogen pre-cooling turboexpanders used for refrigeration may operate at process temperatures between negative 420 F to negative 100 F. Under such conditions loss of process gas and/or contamination with warm sealing gas reduces efficiency and increases operating expense. Other cryogenic applications where loss of process or sealing gas or thermal degradation is undesirable include but are not limited to gas processing, olefin production, and liquefied natural gas (LNG).

An improved thermal barrier sealing system and related methods would be well received in the art.

SUMMARY

According to one aspect, a system comprises a machine having a first end, a bearing carrier, and a shaft seal vent, wherein the machine receives a sealing gas flow; and at least one processor, wherein the at least one processor includes or is in communication with a temperature controller for detecting a temperature of a vent gas flow at the shaft seal vent; wherein the at least one processor and/or the temperature controller are configured to detect a process gas flow through the shaft seal vent based on the detected temperature of the vent gas flow at the shaft seal vent.

According to another aspect, a method comprises providing a sealing gas system, including a machine having a first end, a bearing carrier, a shaft seal vent, and at least one processor, wherein the at least one processor includes or is in communication with a temperature controller; providing a sealing gas flow to the bearing carrier; detecting a temperature of a vent gas flow from the shaft seal vent; and determining a process gas flow through the shaft seal vent based on the detected temperature of the vent gas flow from the shaft seal vent.

According to another aspect, a computer program product comprises a computer readable hardware storage device storing a computer readable program code, the computer readable program code comprising an algorithm that when executed by at least one computer processor of a computing system implements a method comprising detecting a temperature of a vent gas flow from a shaft seal vent of a machine; and determining a process gas flow through the shaft seal vent based on the detected temperature of the vent gas flow from the shaft seal vent.

BRIEF DESCRIPTION

Some of the embodiments will be described in detail, with reference to the following figures, wherein like designations denote like members, wherein.

DETAILED DESCRIPTION

A detailed description of the hereinafter described embodiments of the disclosed apparatus, method, and system are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

In brief overview, sealing systems are disclosed. Embodiments of the sealing systems may be used for machines such as turbomachines operating at cryogenic temperatures. The sealing systems will avoid or reduce warm gas flow to the process side and will minimize the process gas leakage to near zero. The vent may be returned to the low-pressure process gas section of the process. Thus, there is little to no process gas leakage from the system/machine.

Figure 1:
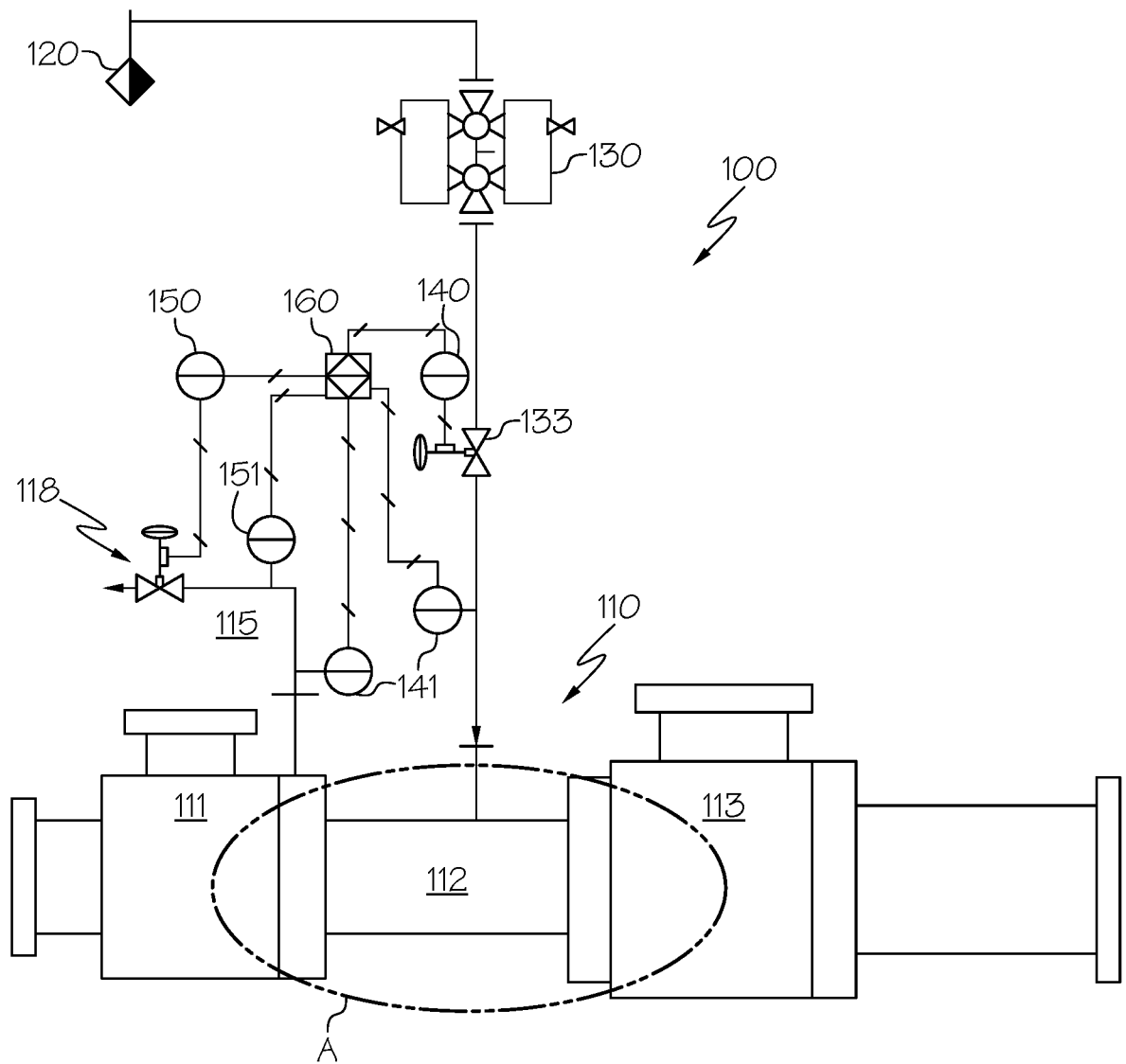
FIG. 1 depicts a sealing system in accordance with an embodiment of the invention.

Referring firstly to FIG. 1, a sealing system 100 is shown according to embodiments. The sealing system 100 includes a machine 110. The machine 110 may include a first end 111, also referred to as a cold end. The machine 110 may also include a bearing carrier 112 and/or a second end 113. In embodiments, the second end 113 may be a hot end. However, it will be understood that in some embodiments both the first end 111 and the second end 113 may be cold ends. Referring again to FIG. 1, the machine 110 may be provided with a sealing gas, for example from a sealing gas supply 120.

Further, the machine 110 may include a shaft seal vent 115. In embodiments, the shaft seal vent 115 may be located proximate the first end 111 and/or between the first end 111 and the bearing carrier 112. Thus, the shaft seal vent 115 may act as a thermal barrier to prevent sealing gas from flowing to the cold first end 111 and to prevent cold process gas from flowing to the bearing carrier 112 and/or the second end 113. As will be discussed in more detail, the shaft seal vent 115 may be adjacent to or be included as part of a shaft seal such as a labyrinth seal.

The first end 111 (cold end) may include a variety of machines/turbomachines, for example, an expander or compressor. Opposite the first end may be the bearing carrier 112 and/or the second end 113. A device may be coupled at the second end. For example, a motor or generator may be located inside the bearing carrier 112 or a compressor, hydrobrake, or other coupled device may be exterior to the bearing carrier at the second end 113. As an example, in one configuration the first end 111 may be an expander (cold end), the bearing carrier 112 may be a bearing housing, and the second end 112 may be a compressor. However, alternative configurations of the machine 110 may be used, as discussed in more detail below with respect to FIGS. 2A-2F, each of which depict an exemplary schematic configuration of area A from FIG. 1 and thus depict an exemplary schematic configuration of the machine 110.

Figure 2A:
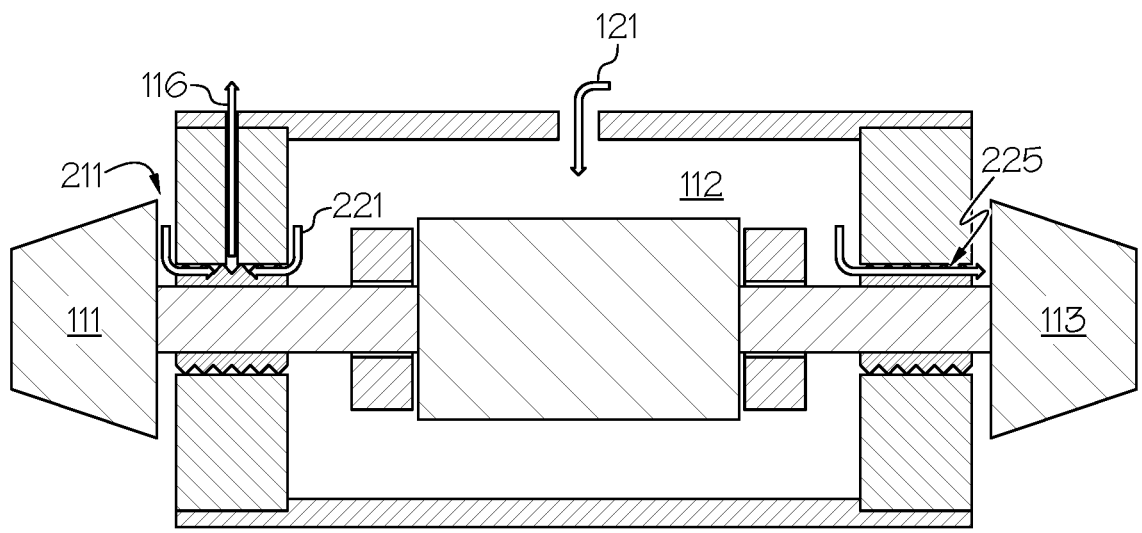
FIG. 2A depicts a more detailed view of a portion A of the sealing system of FIG. 1 in accordance with an embodiment of the invention.

Referring now to FIG. 2A, an expanded view of area A from FIG. 1 is depicted in which the first end 111 is an expander and the second end 113 is a compressor. In this depicted embodiment a single port shaft seal may be used to regulate flow to the shaft seal vent 115. It will be understood that the term regulate is used to represent control of flow; thus, in embodiments the term regulate may include controlling, setting, reducing, throttling, constricting, suppressing, inhibiting, and the like. Process gas flow from the first end 111 is shown by arrow 211. Flow to the shaft seal vent 115 is shown by arrow 116. Further, a sealing gas enters the machine 110 at a sealing gas supply port as shown by arrow 121. Sealing gas flow to the shaft seal vent is shown by arrow 221. Sealing gas may also flow to the second end 113 as shown by arrow 225.

Figure 2B:
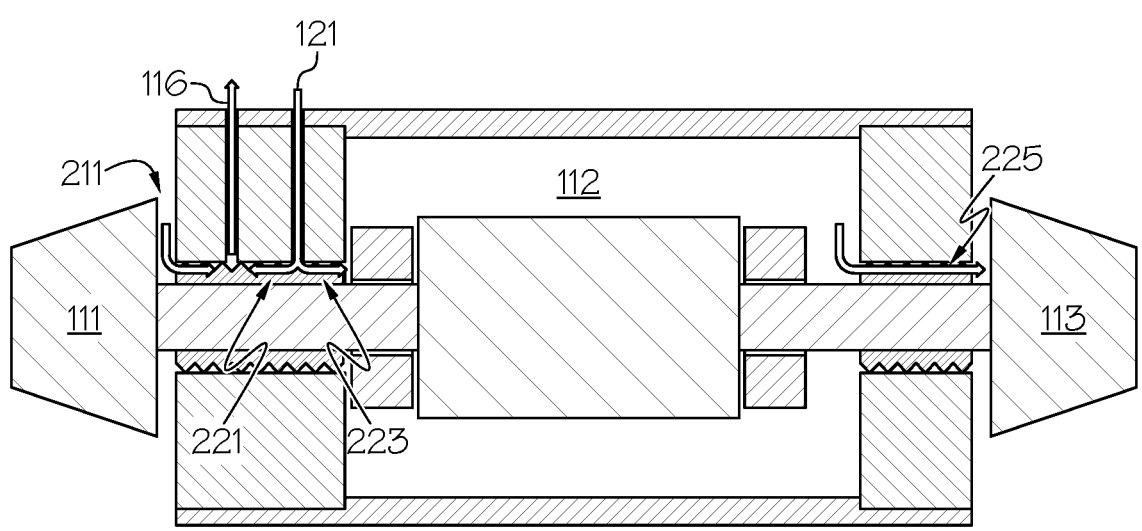
FIG. 2B depicts a more detailed view of the portion A of the sealing system of FIG. 1 in accordance with an embodiment of the invention.

Referring to FIG. 2B, the expanded view of area A from FIG. 1 is depicted in which the first end 111 is an expander and the second end 113 is a compressor. In this depicted embodiment a double port shaft seal may be used to regulate flow to the shaft seal vent 115 and/or flow to the bearing carrier 112. Again, the flow of process gas from the first end 111 is shown by arrow 211. Flow to the shaft seal vent 115 is shown by arrow 116. Sealing gas flow to the machine 110 is shown by arrow 121 and sealing gas flow to the second end 113 is shown by arrow 225. In this embodiment, the sealing gas flow enters one port of the double port shaft seal rather than directly into the bearing carrier 112. The sealing gas may then flow toward the first end 111/shaft seal vent 115 as shown by arrow 221 and the sealing gas may flow toward the bearing carrier 112 as shown by arrow 223.

Figure 2C:
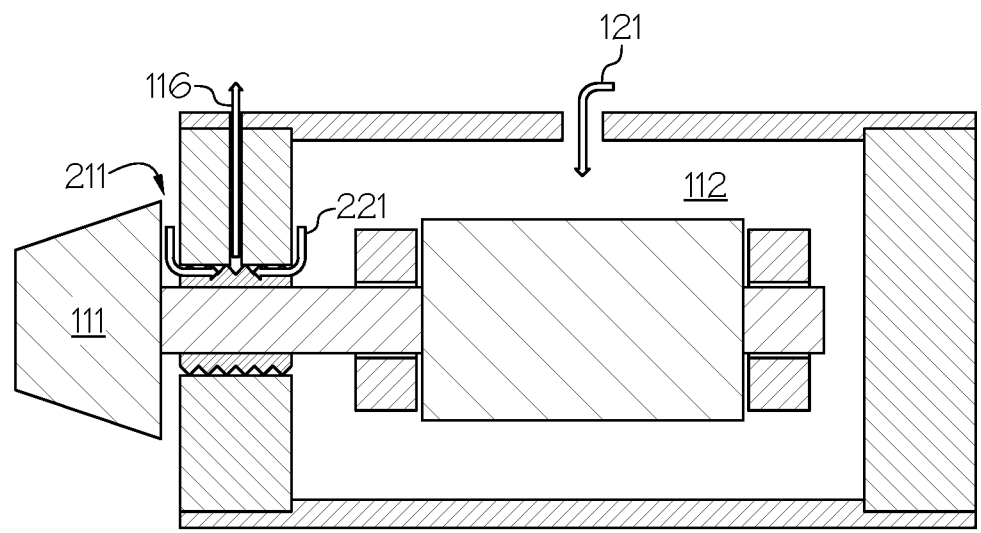
FIG. 2C depicts a more detailed view of the portion A of the sealing system of FIG. 1 in accordance with an embodiment of the invention.

Referring to FIG. 2C, the expanded view of area A from FIG. 1 is depicted in which the first end 111 is an expander or compressor and a motor or generator is used within the bearing carrier 112. In this depicted embodiment a single port shaft seal may be used to regulate flow to the shaft seal vent 115. Again, the flow of process gas from the first end 111 is shown by arrow 211. Flow to the shaft seal vent 115 is shown by arrow 116. Sealing gas flow to the machine 110 is shown by arrow 121. Sealing gas flow to the shaft seal vent 115 is shown by arrow 221.

Figure 2D:
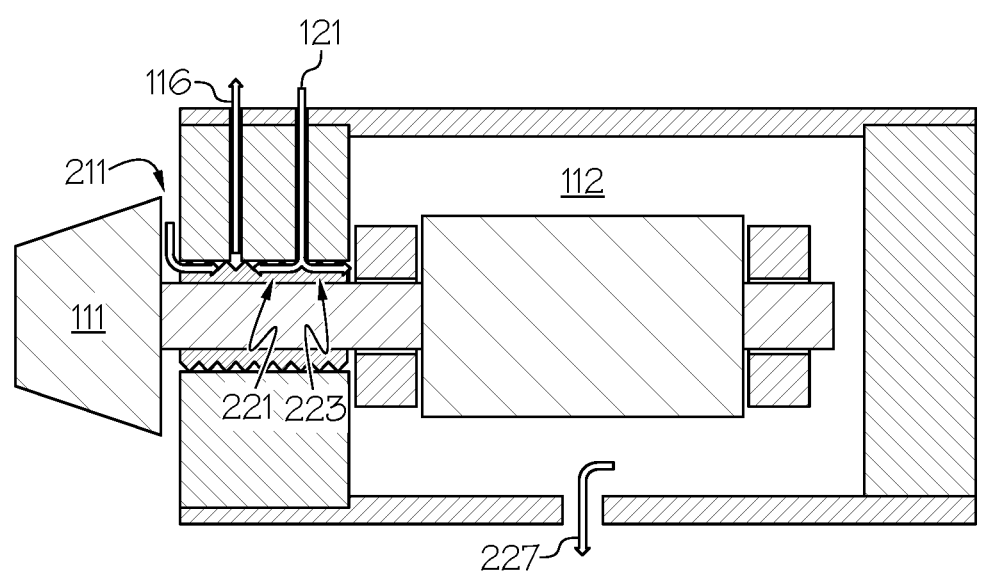
FIG. 2D depicts a more detailed view of the portion A of the sealing system of FIG. 1 in accordance with an embodiment of the invention.

Referring to FIG. 2D, the expanded view of area A from FIG. 1 is depicted in which the first end 111 is an expander or compressor and a motor or generator is used within the bearing carrier 112. In this depicted embodiment a double port shaft seal may be used to regulate flow to the shaft seal vent 115 and/or flow to the bearing carrier 112. Again, the flow of process gas from the first end 111 is shown by arrow 211. Flow to the shaft seal vent 115 is shown by arrow 116. Sealing gas flow to the machine 110 is shown by arrow 121. In this embodiment, sealing gas may also flow out of the machine as shown by arrow 227. In this embodiment, the sealing gas flow enters one port of the double port shaft seal rather than directly into the bearing carrier 112. The sealing gas may then flow toward the first end 111/shaft seal vent 115 as shown by arrow 221 and the sealing gas may flow toward the bearing carrier 112 as shown by arrow 223.

Figure 2E:
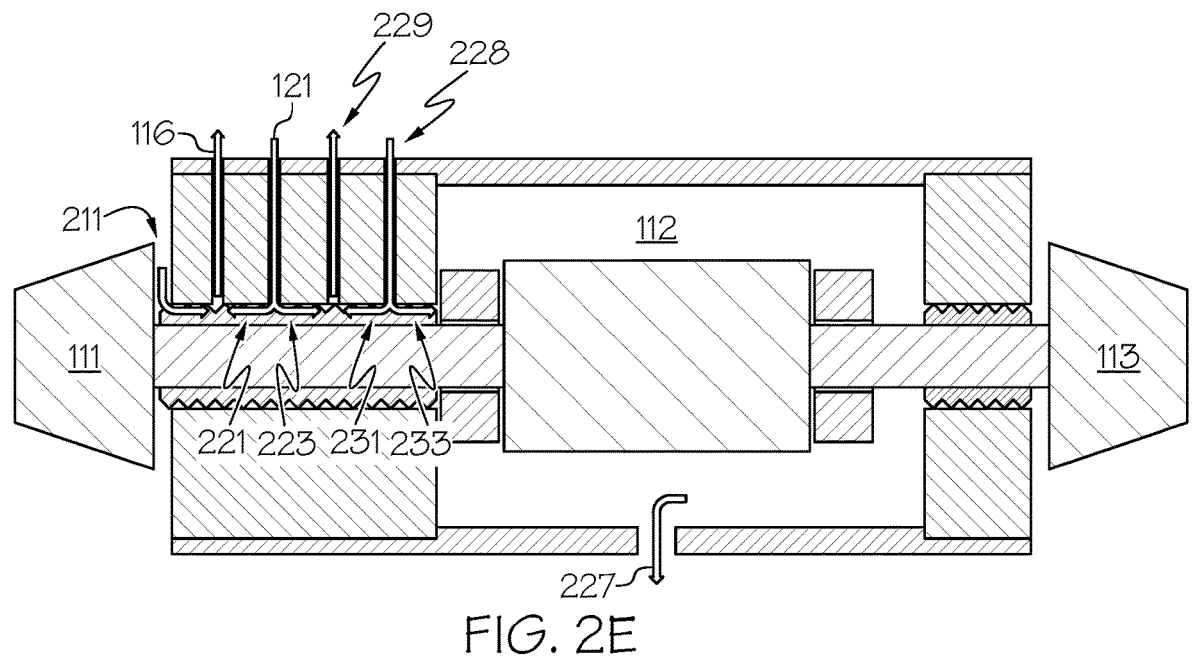
FIG. 2E depicts a more detailed view of the portion A of the sealing system of FIG. 1 in accordance with an embodiment of the invention.

Referring to FIG. 2E, the expanded view of area A from FIG. 1 is depicted in which the first end 111 is an expander and the second end 113 is a hydrobrake or other coupled device. In this depicted embodiment a quadruple port shaft seal may be used to regulate flow to the shaft seal vent 115, flow to the bearing carrier 112, and/or flow of a buffer gas. Again, the flow of process gas from the first end 111 is shown by arrow 211. Flow to the shaft seal vent 115 is shown by arrow 116. Sealing gas flow to the machine 110 is shown by arrow 121. In this embodiment, buffer gas may also flow out of the machine as shown by arrow 227. In this embodiment, the sealing gas flow enters one port of the quadruple port shaft seal rather than directly into the bearing carrier 112. The sealing gas may then flow toward the first end 111/shaft seal vent 115 as shown by arrow 221 and the sealing gas may flow toward the bearing carrier 112/buffer vent as shown by arrow 223. Further, a buffer gas flow may enter the machine 110 is shown by arrow 228. The buffer gas may be used to purge the bearing carrier 112, and may flow through a buffer vent as shown by arrow 229 and/or through the bearing carrier 112. For example, in embodiments, the buffer gas may flow towards the buffer vent as shown by arrow 231 and/or toward the bearing carrier 112 as shown by arrow 233.

Figure 2F:
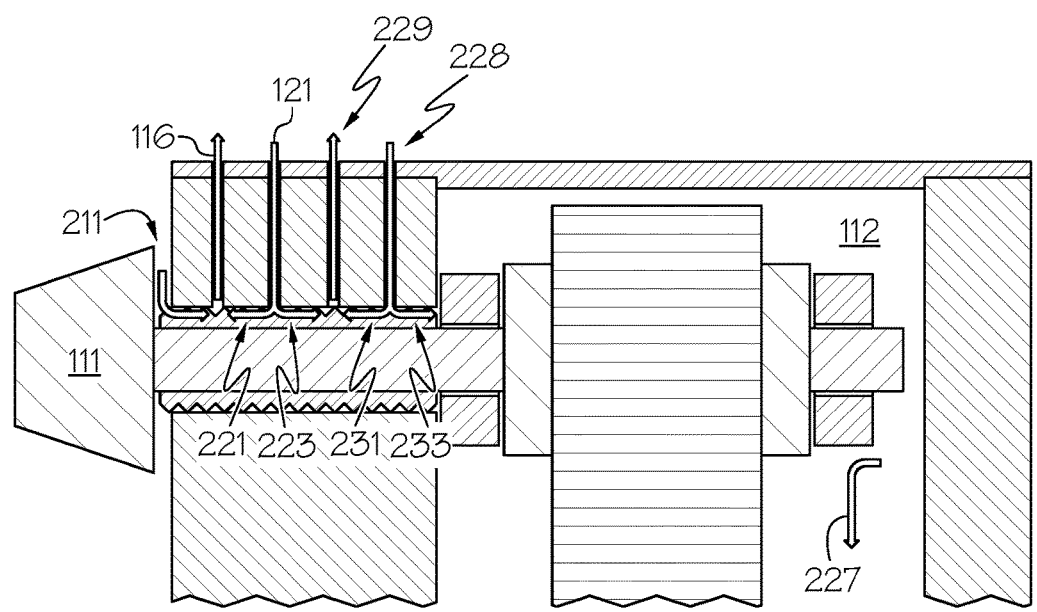
FIG. 2F depicts a more detailed view of the portion A of the sealing system of FIG. 1 in accordance with an embodiment of the invention.

Referring to FIG. 2F, the expanded view of area A from FIG. 1 is depicted in which the first end 111 is an expander or compressor and the bearing carrier 112 includes gearing. In this depicted embodiment a quadruple port shaft seal may be used to regulate flow to the shaft seal vent 115, flow to the bearing carrier 112, and/or flow of a buffer gas. Again, the flow of process gas from the first end 111 is shown by arrow 211. Flow to the shaft seal vent 115 is shown by arrow 116. Sealing gas flow to the machine 110 is shown by arrow 121. In this embodiment, buffer gas may also flow out of the machine as shown by arrow 227. In this embodiment, the sealing gas flow enters one port of the quadruple port shaft seal rather than directly into the bearing carrier 112. The sealing gas may then flow toward the first end 111/shaft seal vent 115 as shown by arrow 221 and the sealing gas may flow toward the bearing carrier 112/buffer vent as shown by arrow 223. Further, a buffer gas flow may enter the machine 110 as shown by arrow 228. The buffer gas may be used to purge the bearing carrier 112, and may flow through a buffer vent as shown by arrow 229 and/or through the bearing carrier 112. For example, in embodiments, the buffer gas may flow towards the buffer vent as shown by arrow 231 and/or toward the bearing carrier 112 as shown by arrow 233.

Referring back to FIG. 1, sealing gas may be sourced from or provided by a sealing gas supply 120. In some embodiments, the sealing gas supply 120 may also provide cooling gas. Warm sealing gas is provided from the sealing gas supply 120. In embodiments, the warm sealing gas may be, for example, at 0 F to 130 F. The warm sealing gas is filtered, for example, by one or more filters 130. The sealing gas may be provided through one or more valves such as valve 133. A pressure of the warm sealing gas is regulated to a minimal positive pressure above the shaft seal vent 115. The sealing system 100 may include a differential pressure controller 140 used to ensure the sealing gas is provided with a pressure greater than the shaft seal vent 115. The differential pressure controller 140 may include, or may be in communication with, pressure sensors 141. In some embodiments, the differential pressure controller 140 may be configured to ensure that the sealing gas has a pressure greater than a pressure in the first end 111 for increased safety—thus preventing cold process gas from traveling from the cold first end 111 into the bearing carrier 112 and/or the second end 113. Typically, the differential pressure controller 140 is set at a lowest practical setting to minimize flow as discussed in more detail below. For example, a setpoint of 5 to 10 psi may be chosen. In embodiments, the differential pressure controller 140 may be part of, or may be in communication with, at least one processor, such as processor 160, or the differential pressure controller 140 may be mechanical. In embodiments, the processor 160 may be a programmable logic controller (PLC).

As shown in FIGS. 1 and 2A-2D, the sealing gas regulated by the differential pressure controller 140 may be provided to the bearing carrier 112 as a sealing gas flow where it cools and protects components within the bearing carrier 112. The sealing gas then exits the bearing carrier 112 to the shaft seal vent 115. In some embodiments, sealing gas may also flow to the second end 113 or may exit the bearing carrier 112. Labyrinth seals may be provided between these components to restrict sealing gas flow as discussed in more detail below.

The shaft seal vent 115 may vent a vent gas flow. In embodiments, the vent gas flow may be mixture of sealing gas from the bearing carrier 112 as well as process gas from the first end 111.

Referring again to FIG. 1, a temperature controller 150 may detect a temperature of the vent gas flow, for example, in connection with a temperature sensor 151. In some embodiments, the temperature controller 150 and/or the temperature sensor 151 may be part of, or may be in communication with, at least one processor, such as the processor 160. Likewise, the temperature controller 150 may be in communication with the differential pressure controller 140 either directly or through the at least one processor 160. In an embodiment, a temperature control setpoint may be significantly lower than the temperature of the supplied sealing gas to allow for stable control. For example, a temperature control setpoint may be 50 F lower than the temperature of the sealing gas. The vent gas flow may be returned to the process so that no gas, or minimal gas, is lost from the machine 110.

A ratio of sealing gas to process gas in the vent gas flow may be determined, for example, based on the temperature detected by the temperature controller 150. For example, a presence of process gas in the vent gas flow may be detected and/or a change in an amount of process gas in the vent gas flow may be determined or approximated. Still further, a characteristic of the vent gas flow or of the process gas flow in the vent gas flow may be determined, for example, a rate of flow, stability, and the like. In embodiments, the processor 160 may perform this determination. In other embodiments, one or more of the temperature controller 150, differential pressure controller 140, processor 160, and/or combinations thereof may perform this determination.

Due to the large temperature difference between the process gas (negative 420 F to negative 100 F) on the one hand, and the sealing gas (0 F to 130 F) on the other hand, small changes in flow from the first end 111 to the shaft seal vent 115 may thus be detected and/or determined. For example, even a small increase in flow of process gas may result in a noticeable decrease in the temperature of the vent gas flow. The temperature controller 150 and/or temperature sensor 151 may sense these changes in temperature.

In some embodiments, additional measurements of the flow through the shaft seal vent 115 may be taken, for example, by the temperature controller 150, the processor 160, the differential pressure controller 140, pressure sensors 141 and/or additional instrumentation. For example, a flow or characteristic of the flow may be detected, including rate of flow, stability, and the like.

Upon detecting a change in the temperature of the vent gas flow, determining the presence of process gas flow in the vent gas flow, and/or detecting other characteristics of the flow through the shaft seal vent 115, the sealing system 100 may adjust settings of the sealing system 110. For example, settings may be adjusted to minimize flow from the first end 111 to the shaft seal vent 115 and to prevent or reduce process gas in the vent gas flow. Flow through the shaft seal vent 115 may be adjusted, regulated, and/or restricted. In some embodiments, a valve such as valve 118 may be adjusted. For example, valve 118 may be actuated to further restrict flow. Alternatively or additionally, in some embodiments pressure of the sealing gas supplied to the bearing carrier 112 may be adjusted and/or actuated, for example, by the processor 160 and/or the differential pressure controller 140. In other embodiments, alternative or additional adjustments may be made.

Turning in more detail to the labyrinth seals discussed above, a single port labyrinth seal, a double port labyrinth seal, or a quadruple port labyrinth seal may be used. Further, seals having additional ports may be used as needed. In embodiments, floating ring seals may also be used. Exemplary embodiments of a single port labyrinth seal and a double port labyrinth seal are shown in FIG. 3 and FIG. 4, respectively.

Figure 3:
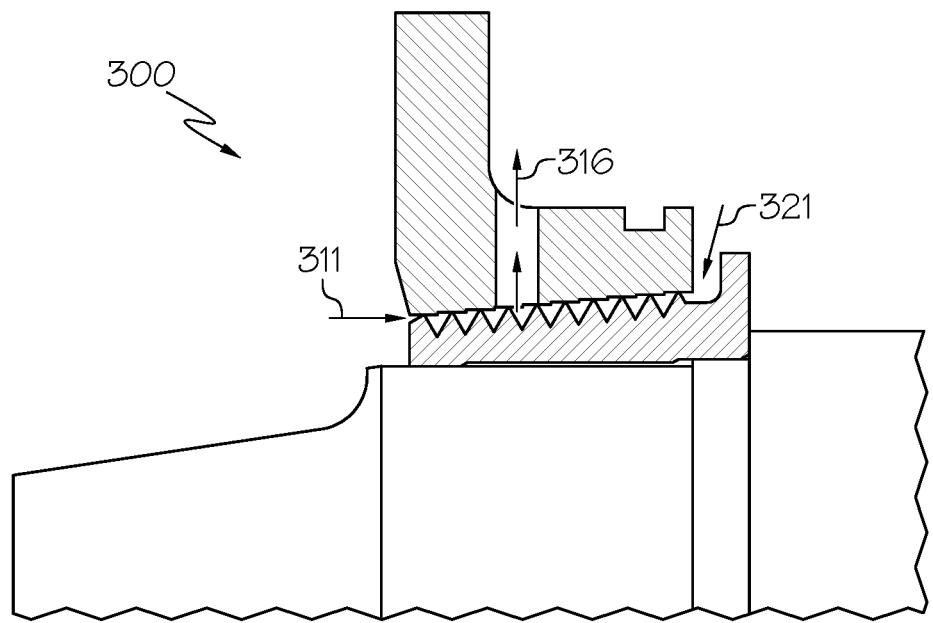
FIG. 3 depicts a thermal barrier shaft seal in accordance with an embodiment of the invention wherein the thermal barrier shaft seal is a single port labyrinth seal.

FIG. 3 depicts a single port labyrinth seal 300 according to embodiments. The single port labyrinth seal 300 may be used when space is limited. The single port labyrinth seal 300 may be positioned adjacent to the shaft seal vent 115. In FIG. 3, arrow 311 represents a flow from the first end 111 while arrow 321 represents a flow of sealing gas (dependent on a pressure of the sealing gas provided to the bearing carrier 112). Arrow 316 represents the vent gas flow through the shaft seal vent 115. Thus, arrow 316 includes sealing gas flowing to the shaft seal vent 115 and may also include process gas from the first end 111 flowing to the shaft seal vent 115. The flow of arrow 316 may be directly related to the respective flows represented by arrows 311 and 321.

Figure 4:
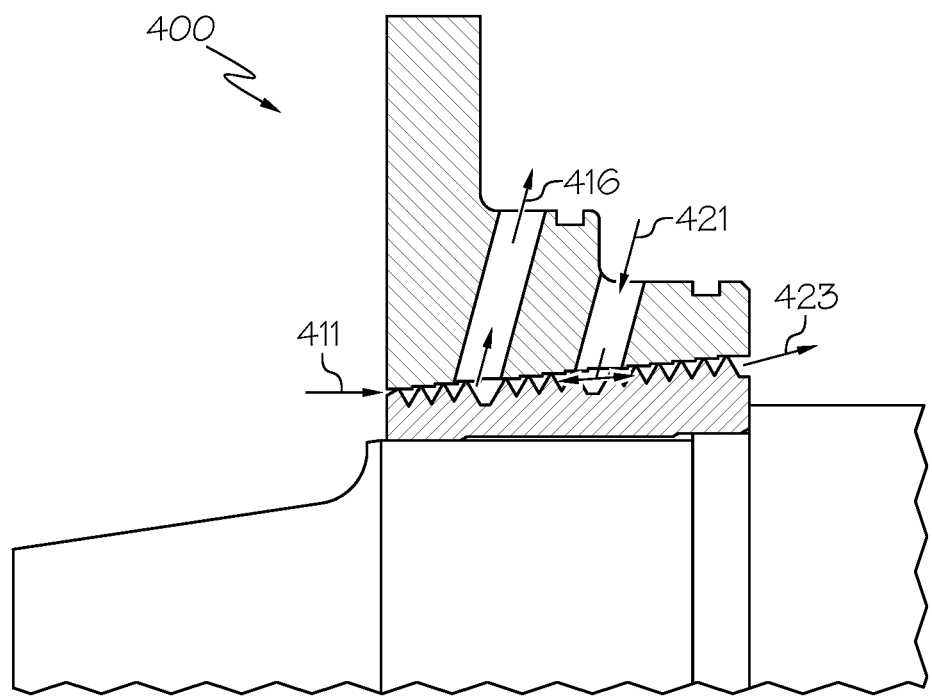
FIG. 4 depicts a thermal barrier shaft seal in accordance with an embodiment of the invention wherein the thermal barrier shaft seal is a two port labyrinth seal.

In other embodiments, a double port labyrinth seal such as the double port labyrinth seal 400 depicted in FIG. 4 may be used. The double port labyrinth seal 400 may allow for lower pressure in the bearing carrier 112, thus reducing windage losses. Similar to the single port labyrinth seal 300 of FIG. 3, the double port labyrinth seal 400 may be positioned adjacent to shaft seal vent 115. In FIG. 4, arrow 411 represents a flow of process gas from the first end 111 and arrow 421 represents a flow of sealing gas from the sealing gas supply 120. In the depicted embodiment, the sealing gas will flow toward the first end 111 and/or the shaft seal vent 115 as well as toward the bearing carrier 112. Arrow 423 represents the flow of sealing gas into the bearing carrier 112. Arrow 416 represents the vent gas flow through the shaft seal vent 115. Thus, arrow 416 includes sealing gas flow to the shaft seal vent 115 and may also include process gas from the first end 111 flowing to the shaft seal vent 115. The flow of arrow 416 may be directly related to the respective flows represented by arrows 411 and 421.

Turning back to FIG. 1, the processor 160, temperature controller 150, and/or the differential pressure controller 140 may act to control the flow through the shaft seal vent 115. For example, the valve 118 may be adjusted/actuated to regulate or restrict flow through the shaft seal vent 115. Alternatively, a pressure of the sealing gas flow to the bearing carrier 112 may be adjusted or other adjustments may be made.

For example, approximate process gas flow to the shaft seal vent 115 may be determined using the following formula:

$$\dot{m}_{AC} = \dot{m}_{BC} \frac{T_B - T_C}{T_C - T_A}$$

$\dot{m}_{AC}$=First End Process Gas to Shaft Seal Vent Mass Flow, lb/hr
$\dot{m}_{BC}$=Sealing Gas to Shaft Seal Vent Mass Flow, lb/hr
$T_A$=First End Process Gas Absolute Temperature, R
$T_B$=Sealing Gas Absolute Temperature, R
$T_C$=Vent Gas Flow Absolute Temperature, R In embodiments, the process gas flow to the shaft seal vent 115 is maintained at a fraction of the sealing gas flow to the shaft seal vent 115, depending on the available temperature, pressures, and flows.

EXAMPLE

The following example is provided for exemplary purposes only and illustrates operating pressures, temperatures, and flows on a final stage of a hydrogen liquefaction refrigeration circuit. For the purposes of the example, a setpoint of the differential pressure controller 140 is 10 psi and a setpoint of the temperature controller 150 is negative 80 F. The respective pressures and temperatures at various locations of the circuit would be expected:

| Location | Description | Pressure [psia] | Temperature [F.] |
| --- | --- | --- | --- |
| 111 | First End | 87 | Negative 398 |
| 112 | Bearing Carrier | 97 | 97 |
| 115 | Shaft Seal Vent | 87 | Negative 80 |
| 113 | Second End | 49 | 90 |
| 120 | Sealing Gas Supply | 415 | 97 |

In this example, the respective flows would be as follows:

| Location | Description | Flow [lb/hr] |
| --- | --- | --- |
| 111-115 | Process Gas to Shaft Seal Vent | 20 |
| 112-115 | Sealing Gas to Shaft Seal Vent | 32 |
| 112-113 | Sealing Gas to Second End | 46 |

Changes to the vent gas flow, and thus underlying changes to the process gas flow included in the vent gas flow, for example, deviations from the temperature setpoint of negative 80 F, may be determined based on temperature variations detected by the temperature sensor 151, the temperature controller 150, and/or the processor 160. In embodiments, detected temperature changes may be reported to the at least one processor 160 and/or directly to the temperature controller 150 and/or the differential pressure controller 140. In response, the temperature controller 150, the differential pressure controller 140, and/or the processor 160 may adjust settings of the sealing system 100. For example, the processor 160, temperature controller 150, and/or the differential pressure controller 140 may adjust the valve 118 to regulate or restrict flow through the shaft seal vent 115. In other embodiments, the processor 160 and/or the differential pressure controller 140 may adjust the setpoint and/or the pressure of the sealing gas supplied to the bearing carrier 112 or may take other action to adjust operation of the sealing system 100. Adjustments may be made with the goal of reducing or eliminating first end process flow through the shaft seal vent 115. In some embodiments, other control settings may also be adjusted.

Figure 5:
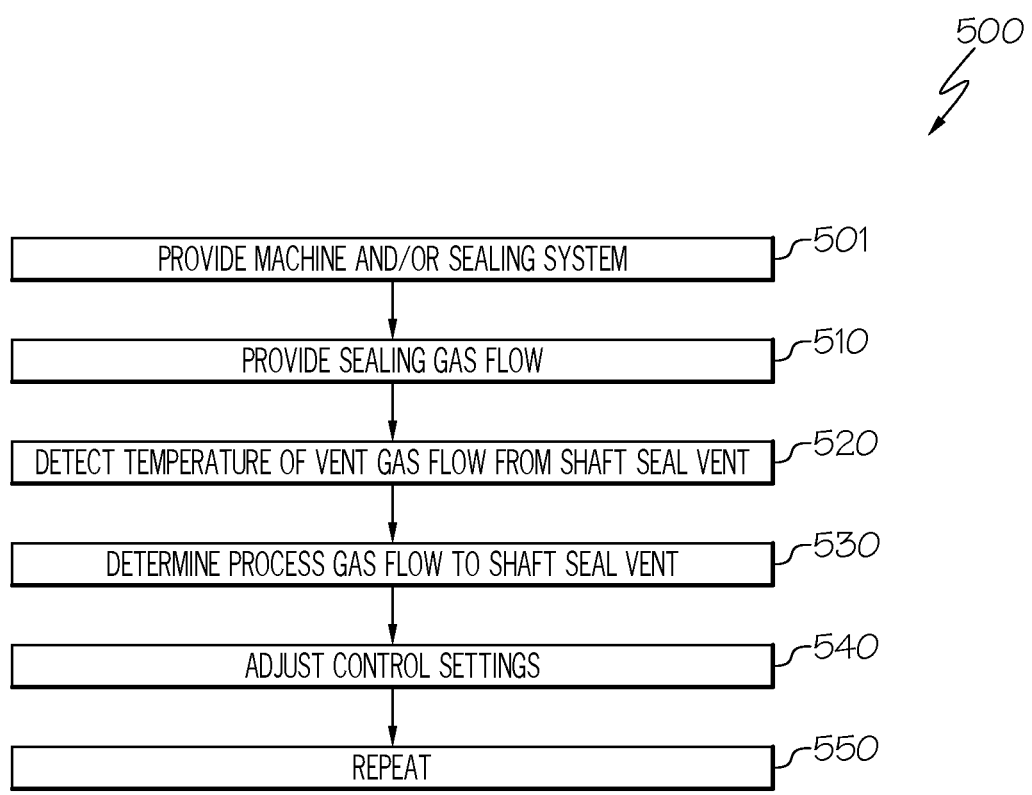
FIG. 5 depicts a flow chart of a method in accordance with an embodiment of the invention.

Embodiments may also include related methods. FIG. 5 depicts a flow chart of an exemplary method 500. Embodiments of the method 500 may begin at step 501, wherein a machine and/or a sealing system for the machine are provided, such as the sealing gas system 100 and/or the machine 110 having the respective components discussed above. In some embodiments, step 501 may not be required, and the method may begin with step 510.

In step 510, a sealing gas flow is provided to the machine. The sealing gas flow may be provided to a bearing carrier such as bearing carrier 112, for example, by a sealing gas supply such as the sealing gas supply 120. In some embodiments, the sealing gas may be provided directly to the bearing carrier or the sealing gas may be provided through a labyrinth seal such as the double port labyrinth seal 400 described above. In embodiments, step 510 may include filtering and/or regulating the sealing gas, for example, by a filter such as the filter 130 and/or by a differential pressure controller such as the differential pressure controller 140.

In step 520, a temperature of a vent gas flow from a shaft seal vent such as the shaft seal vent 115 is detected by a temperature controller such as the temperature controller 150. In some embodiments a temperature sensor such as temperature sensor 151 may be used.

In step 530, a process gas flow to the shaft seal vent is determined. Determination of the process gas flow may encompass determining that process gas is present at the shaft seal vent based on a change in temperature as discussed in more detail above. Determination of the process gas flow to the shaft seal vent may be performed by a processor, such as the processor 160, and/or by a combination of the differential pressure controller, temperature controller, and/or processor. The process gas flow to the shaft seal vent may be determined based on the detected temperature of the vent gas flow as is discussed in more detail above.

In step 540, control settings of the sealing gas system may be adjusted based on the determination of the process gas flow to the shaft seal vent. For example, a valve such as valve 118 may be adjusted to regulate and/or restrict flow through the shaft seal vent. Alternatively and/or additionally, the sealing gas flow to the bearing carrier may be adjusted or controlled to adjust the process gas flow to the shaft seal vent. Other control settings may be adjusted as needed. For example, the sealing gas flow may be decreased increased in order to reduce or eliminate a detected process gas flow to the shaft seal vent. As a further example, the pressure of the sealing gas may be increased in order to reduce or eliminate a detected process gas flow to the shaft seal vent.

An optional step 550 is included. Optional step 550 may comprise repeating and/or continuing one or more of the steps 520-540. For example, an adjusted valve setting may be used, an adjusted sealing gas flow may be provided to the bearing carrier, a temperature of adjusted vent gas flow from the shaft seal vent may be detected, an adjusted process gas flow to the shaft seal vent may be determined, and/or adjusted control settings may be further adjusted.

Figure 6:
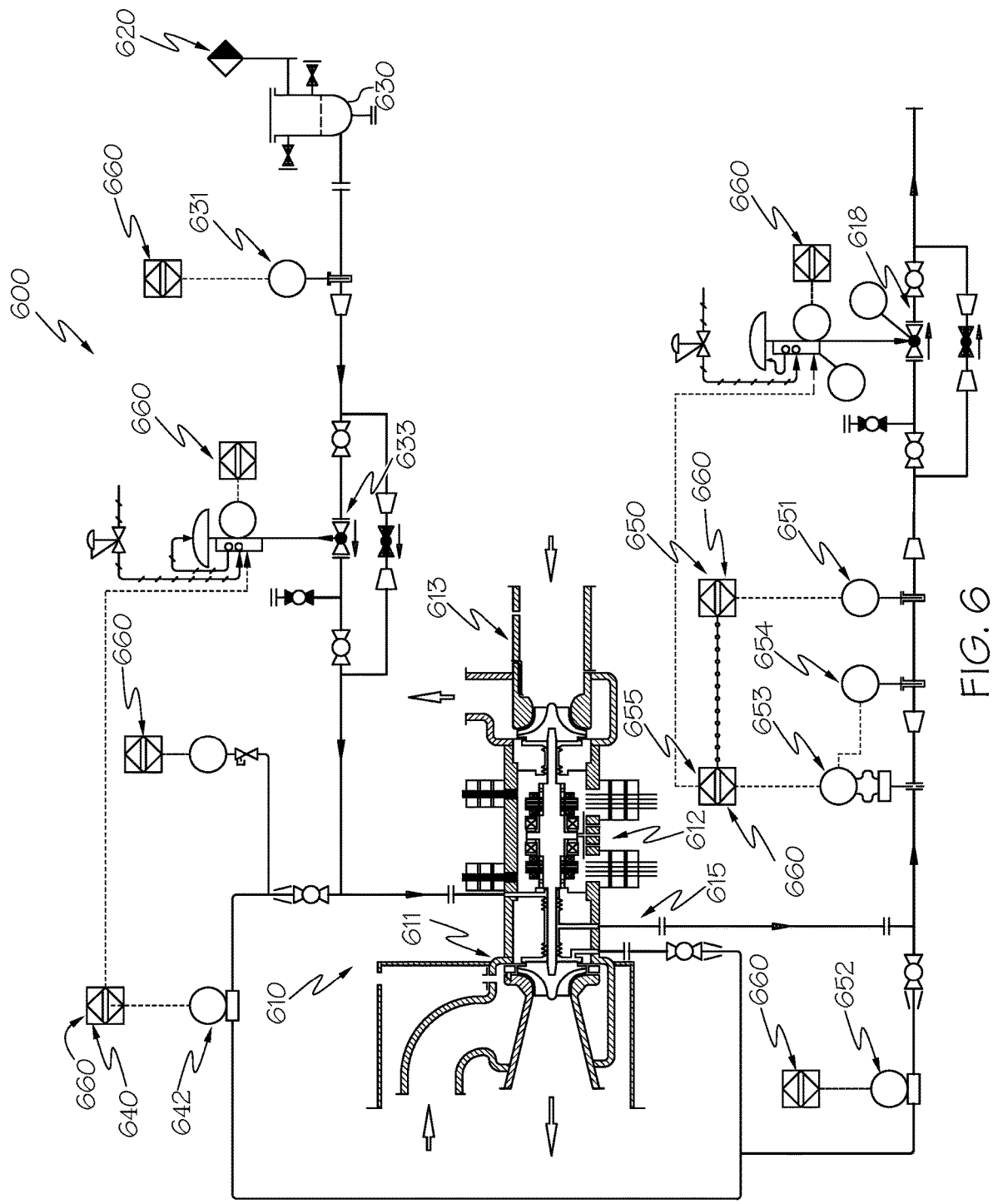
FIG. 6 depicts a sealing system in accordance with a further embodiment of the invention.

Referring now to FIG. 6, a sealing system 600 is shown according to embodiments. It will be understood that disclosure regarding the sealing system 100 may apply to the sealing system 600 and vice versa. Further, it will be understood that the sealing system 600 may be used with, configured for, and/or adapted for use with the seals discussed herein, such as one or more of the seals depicted in FIGS. 2A-2F, 3, and 4.

The sealing system 600 includes a machine 610. The machine 610 may include a first end 611, also referred to as a cold end. The machine 610 may also include a bearing carrier 612 and/or a second end 613. In embodiments, the second end 613 may be a hot end. However, it will be understood that in some embodiments both the first end 611 and the second end 613 may be cold ends. The machine 610 may be provided with a sealing gas, for example from a sealing gas supply 620.

Further, the machine 610 may include a shaft seal vent 615. In embodiments, the shaft seal vent 615 may be located proximate the first end 611 and/or between the first end 611 and the bearing carrier 612. Thus, the shaft seal vent 615 may act as a thermal barrier to prevent sealing gas from flowing to the cold first end 611 and to prevent cold process gas from flowing to the bearing carrier 612 and/or the second end 613. As will be discussed in more detail, the shaft seal vent 615 may be adjacent to or be included as part of a shaft seal such as a labyrinth seal.

The first end 611 (cold end) may include a variety of machines/turbomachines, for example, an expander or compressor. Opposite the first end may be the bearing carrier 612 and/or the second end 613. A device may be coupled at the second end. In the depicted embodiment, the first end 611 is an expander and the second end 613 is a compressor. However, alternative configurations of the machine 610 as discussed in more detail above, for example with respect to FIG. 1 as well as FIGS. 2A through 2F.

Referring still to FIG. 6, sealing gas may be sourced from or provided by a sealing gas supply 620. In some embodiments, the sealing gas supply 620 may also provide cooling gas. Warm sealing gas is provided from the sealing gas supply 620. In embodiments, the warm sealing gas may be, for example, at 0 F to 130 F. This warm sealing gas supply temperature may be measured by a temperature sensor 631, which may include, or may be in communication with, at least one processor.

Referring to the at least one processor, FIG. 6 depicts individual components as connecting to processors 660 and depicts multiple elements labelled as 660. It will be understood that processor(s) 660 may be different processors, may be different processors in communication with each other, may be the same processor such as a central processor, may be different control functions of the same processor, may be different control functions of various processors, combinations thereof, etc. In embodiments, processor 660 may be a programmable logic controller (PLC).

For example, referring back to the temperature sensor 631, the temperature sensor 631 is depicted as a sensor component connected to processor 660. The specific implementation of the individual elements may vary as discussed above.

Continuing on with FIG. 6, the warm sealing gas is filtered, for example, by one or more filters 630. The sealing gas may be provided through one or more valves such as valve 633. A pressure of the warm sealing gas is regulated to a minimal positive pressure above the first (expander) end 611. The sealing system 600 may include a differential pressure controller 640 used to ensure the sealing gas is provided with a pressure greater than the first (expander) end 611. The differential pressure controller 640 may include, or may be in communication with, pressure differential pressure sensor 642. Typically, the differential pressure controller 640 is set at a lowest practical setting to minimize flow as discussed in more detail below. For example, a setpoint of 5 to 10 psi may be chosen. In embodiments, the differential pressure controller 640 may be part of, or may be in communication with, processor 660, or the differential pressure controller 640 may be mechanical. In embodiments, processor 660 may be a programmable logic controller (PLC) as discussed above.

As shown in FIGS. 6 and 2A-2D, the sealing gas regulated by the differential pressure controller 640 may be provided to the bearing carrier 612 as a sealing gas flow where it cools and protects components within the bearing carrier 612. The sealing gas then exits the bearing carrier 612 to the shaft seal vent 615. In some embodiments, sealing gas may also flow to the second end 613 or may exit the bearing carrier 612. Labyrinth seals may be provided between these components to restrict sealing gas flow as discussed in more detail above.

The shaft seal vent 615 may vent a vent gas flow. In embodiments, the vent gas flow may be mixture of sealing gas from the bearing carrier 612 as well as process gas from the first end 611.

Referring again to FIG. 6, a temperature controller 650 may detect a temperature of the vent gas flow, for example, in connection with a temperature sensor 651. In some embodiments, the temperature controller 650 and/or the temperature sensor 651 may be part of, or may be in communication with, processor 660, as discussed above. Likewise, the temperature controller 650 may be in communication with the differential pressure controller 640 and a flow controller 655 either directly or through processor 660. In an embodiment, a temperature control setpoint may be significantly lower than the temperature of the supplied sealing gas to allow for stable control. For example, a temperature control setpoint may be 50 F lower than the temperature of the sealing gas. The vent gas flow may be returned to the process so that no gas, or minimal gas, is lost from the machine 610.

A ratio of sealing gas to process gas in the vent gas flow may be determined, for example, based on the temperature detected by the temperature controller 650. For example, a presence of process gas in the vent gas flow may be detected and/or a change in an amount of process gas in the vent gas flow may be determined or approximated. Still further, a characteristic of the vent gas flow or of the process gas flow in the vent gas flow may be determined, for example, a rate of flow, stability, and the like. In embodiments, the processor may perform this determination. In other embodiments, one or more of the temperature controller 650, differential pressure controller 640, processor, and/or combinations thereof may perform this determination.

Due to the large temperature difference between the process gas (negative 420 F to negative 100 F) on the one hand, and the sealing gas (0 F to 130 F) on the other hand, small changes in flow from the first end 611 to the shaft seal vent 615 may thus be detected and/or determined. For example, even a small increase in flow of process gas may result in a noticeable decrease in the temperature of the vent gas flow. The temperature controller 650 and/or temperature sensor 651 may sense these changes in temperature.

In some embodiments, an additional flow controller may be included, such as flow controller 655 shown in FIG. 6. The flow controller 655 may detect a change in shaft seal vent flow in connection with a flow sensor 653, for example, a change in a rate of flow, stability of flow, or other characteristic. The flow controller 655 may also compensate this flow measurement for temperature in connection with an additional temperature sensor 654. The flow controller 655 may work in connection with temperature controller 650. For example, in embodiments, the flow controller 655 may receive a setpoint from temperature controller 650 based on calculated process gas flow or changes in shaft seal vent flow temperature. For example, the temperature controller 650 may sense changes in shaft seal vent flow temperature and adjust the flow controller 655 setpoint to correct. The flow controller 655 may make adjustments in the system 600, for example, restricting the flow with valve 618, in order to meet the desired process flow and/or to adjust or regulate the rate of flow, stability of flow, or other characteristic. In embodiments, the flow controller 655 may be a fast-acting inner control loop for the temperature controller 650, because the temperature controller 650 by itself may be too slow for stable system response. For example, the flow controller 655 may operate directly on valve 618, or through processor 660, based on changes in shaft seal vent flow and setpoint provided by temperature controller 650. Thus, use of the flow controller 655 may provide cascade control as opposed to single-loop control. Relatedly, use of the flow controller 655 may provide faster and/or more precise control as compared with relying on the temperature controller 650 alone.

In some embodiments, additional measurements of the differential pressure between the shaft seal vent 615 and the first end 611 may be taken, for example, for use by the temperature controller 650, the at least one processor, the flow controller 655, the differential pressure controller 640, pressure differential pressure sensor 642, an additional pressure differential pressure sensor 652, and/or additional instrumentation. For example, these additional measurements may be used as confirmation or control of the low (near zero) differential pressure between the first end 611 and shaft seal vent 615. Upon detecting a change in the temperature of the vent gas flow, determining the presence of process gas flow in the vent gas flow, and/or detecting other characteristics of the flow through the shaft seal vent 615, the sealing system 600 may adjust settings of the sealing system 610. For example, settings may be adjusted to minimize flow from the first end 611 to the shaft seal vent 615 and to prevent or reduce process gas in the vent gas flow. Flow through the shaft seal vent 615 may be adjusted, regulated, and/or restricted. In some embodiments, a valve such as valve 618 may be adjusted. For example, valve 618 may be actuated to further restrict flow. Alternatively or additionally, in some embodiments pressure of the sealing gas supplied to the bearing carrier 612 may be adjusted and/or actuated, for example, by the at least one processor and/or the differential pressure controller 640. In other embodiments, alternative or additional adjustments may be made.

Figure 7:
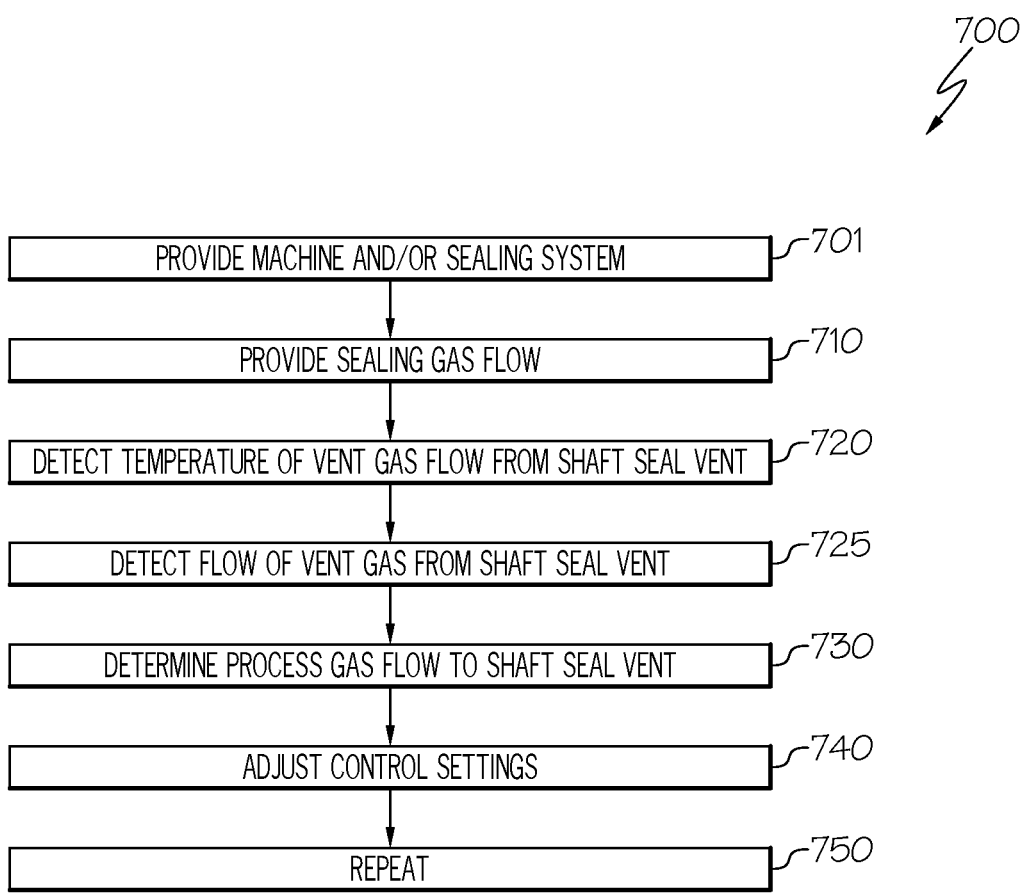
FIG. 7 depicts a flow chart of a method in accordance with a further embodiment of the invention.

Embodiments may also include related methods. FIG. 7 depicts a flow chart of an exemplary method 700. It will be understood that disclosure regarding the method 500 may apply to the method 700 and vice versa.

Embodiments of the method 700 may begin at step 701, wherein a machine and/or a sealing system for the machine are provided, such as the sealing gas system 600 and/or the machine 610 having the respective components discussed above. In some embodiments, step 701 may not be required, and the method may begin with step 710.

In step 710, a sealing gas flow is provided to the machine. The sealing gas flow may be provided to a bearing carrier such as bearing carrier 612, for example, by a sealing gas supply such as the sealing gas supply 620. In some embodiments, the sealing gas may be provided directly to the bearing carrier or the sealing gas may be provided through a labyrinth seal such as the double port labyrinth seal 400 described above. In embodiments, step 710 may include filtering and/or regulating the sealing gas, for example, by a filter such as the filter 630 and/or by a differential pressure controller such as the differential pressure controller 640.

In step 720, a temperature of a vent gas flow from a shaft seal vent such as the shaft seal vent 615 is detected by a temperature controller such as the temperature controller 650. In some embodiments a temperature sensor such as temperature sensor 651 may be used.

Method 700 may also include step 725, either in addition to step 720 or as an alternative to step 720, in which a flow of vent gas from the shaft seal vent is detected or determined. For example, flow of vent gas from the shaft seal vent may be determined by a flow sensor, such as the flow sensor 653, by a flow controller, such as the flow controller 655, and/or by other components. In embodiments, the flow controller may detect a rate of flow, a stability of flow, other flow characteristics, and/or changes in one or more of these values.

In step 730, a process gas flow to the shaft seal vent is determined. Process gas flow to the shaft seal vent may be determined based on the detected temperature and/or detected flow discussed above. For example, determination of the process gas flow may encompass determining that process gas is present at the shaft seal vent based on a change in temperature as discussed in more detail above and/or based on a change in flow as discussed in more detail above. Determination of the process gas flow to the shaft seal vent may be performed by a processor, such as processor 660, and/or by a combination of the differential pressure controller, temperature controller, flow controller, and/or processor.

In step 740, control settings of the sealing gas system may be adjusted based on the determination of the process gas flow to the shaft seal vent. For example, a valve such as valve 618 may be adjusted to regulate and/or restrict flow through the shaft seal vent. Alternatively and/or additionally, the sealing gas flow to the bearing carrier may be adjusted or controlled to adjust the process gas flow to the shaft seal vent. Other control settings may be adjusted as needed. For example, the sealing gas flow and/or the pressure of the sealing gas flow may be increased in order to reduce or eliminate a detected process gas flow to the shaft seal vent.

An optional step 750 is included. Optional step 750 may comprise repeating and/or continuing one or more of the steps 720-740. For example, an adjusted valve setting may be used, an adjusted sealing gas flow may be provided to the bearing carrier, a temperature of adjusted vent gas flow from the shaft seal vent may be detected, an adjusted process gas flow to the shaft seal vent may be determined, and/or adjusted control settings may be further adjusted. It will be understood that in embodiments when steps are repeated, respective repetitions may include detecting temperature through step 720, may include detecting flow through step 725, or both.

Aspects of the present invention are described herein with reference to the flowchart illustrations. It will be understood that, in some embodiments, method steps may be performed out of order, method steps may be omitted, and/or additional method steps may be included. Further, it will be understood that each block of the flowchart illustrations can be implemented by computer-readable program instructions.

A further embodiment of the present invention relates to a computer program product (non-transitory computer readable storage medium having instructions, which when executed by a processor, perform actions). The computer program product may comprise a computer readable hardware storage device storing a computer readable program code, the computer readable program code comprising an algorithm that when executed by a computer processor of a computing system implement one or more methods described herein, for example, methods for determining process gas flow through a shaft seal vent and/or adjusting control settings to control process gas flow through a shaft seal vent.

Figure 8:
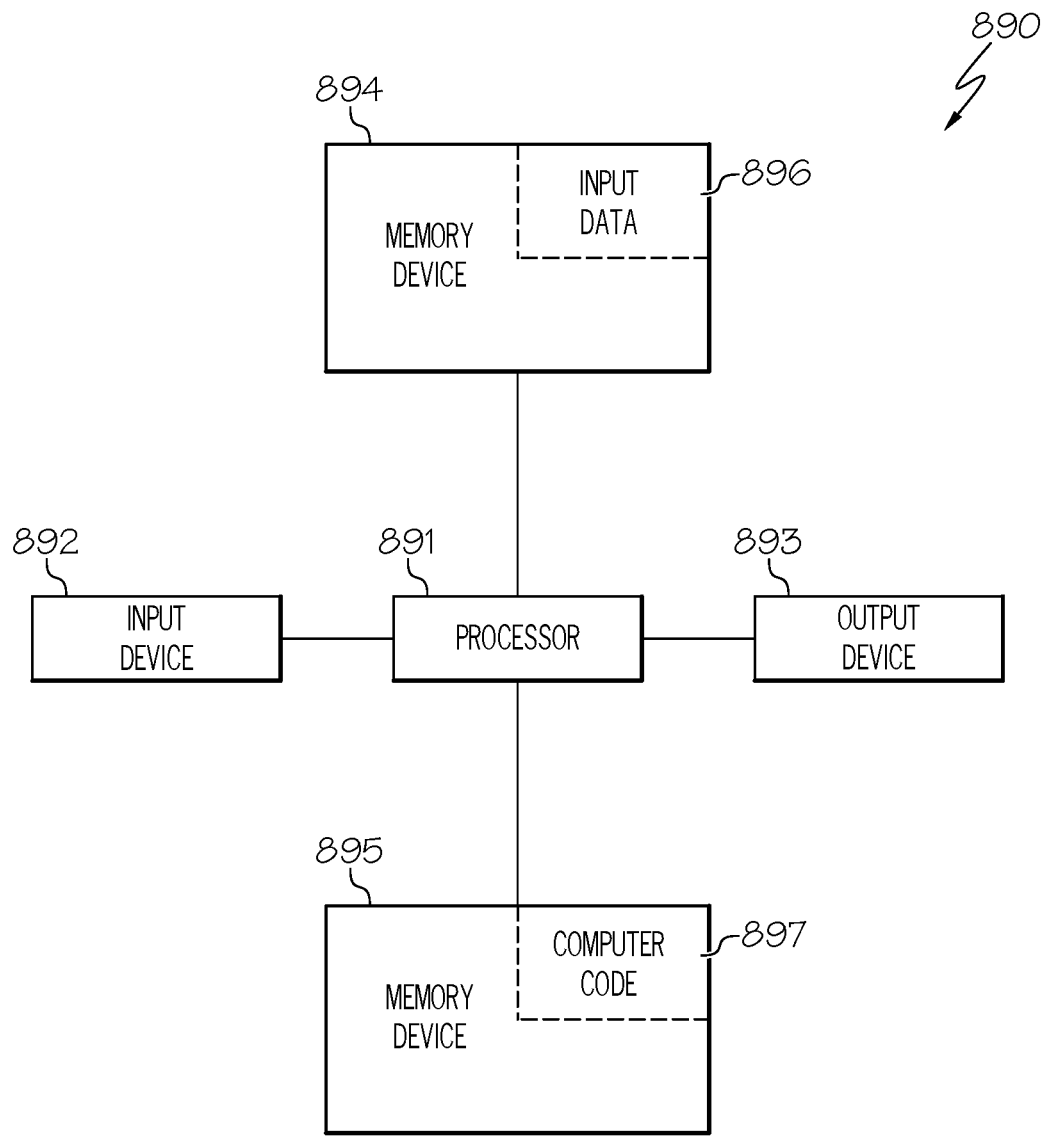
FIG. 8 depicts an embodiment of a computing system of a gas compression system.

FIG. 8 illustrates a computer system 890 used for methods in accordance with embodiments of the present disclosure. The computer system 890 may comprise a processor 891, an input device 892 coupled to the processor 891, an output device 893 coupled to the processor 891, and memory devices 894 and 895 each coupled to the processor 891. The input device 892 may be, inter alia, a keyboard, a mouse, etc. The output device 893 may be, inter alia, a printer, a plotter, a computer screen, a magnetic tape, a removable hard disk, a floppy disk, etc. The memory devices 894 and 895 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 895 may include a computer code 897 which may be a computer program that comprises computer-executable instructions. The computer code 897 includes software or program instructions that may detect a temperature of a vent gas flow and detect or determine process gas flow. The processor 891 executes the computer code 897. The memory device 894 includes input data 896. The input data 896 includes input required by the computer code 897. The output device 893 displays output from the computer code 897. Either or both memory devices 894 and 895 (or one or more additional memory devices not shown in FIG. 8) may be used as a computer usable storage medium (or program storage device) having a computer readable program embodied therein and/or having other data stored therein, wherein the computer readable program comprises the computer code 897. Generally, a computer program product (or, alternatively, an article of manufacture) of the computer system 890 may comprise said computer usable storage medium (or said program storage device).

While FIG. 8 depicts the computer system 890 as a particular configuration of hardware and software, any configuration of hardware and software, as would be known to a person of ordinary skill in the art, may be utilized for the purposes stated supra in conjunction with the particular computer system 890 of FIG. 8. For example, the memory devices 894 and 895 may be portions of a single memory device rather than separate memory devices.

In some embodiments, rather than being stored and accessed from a hard drive, optical disc or other writeable, rewriteable, or removable hardware memory device 895, stored computer program code 897 may be stored on a static, nonremovable, read-only storage medium such as a Read-Only Memory (ROM) device, or may be accessed by processor 891 directly from such a static, nonremovable, read-only medium. Similarly, in some embodiments, stored computer program code 897 may be stored as computer-readable firmware, or may be accessed by processor 891 directly from such firmware, rather than from a more dynamic or removable hardware data-storage device 895, such as a hard drive or optical disc.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A system, comprising:
   a machine having a first end, a bearing carrier, and a shaft seal vent, wherein the machine receives a sealing gas flow; and
   at least one processor, wherein the at least one processor includes or is in communication with a temperature controller for detecting a temperature of a vent gas flow at the shaft seal vent;
   wherein the at least one processor and/or the temperature controller are configured to detect a process gas flow through the shaft seal vent based on the detected temperature of the vent gas flow at the shaft seal vent.

2. The system of claim 1, wherein the at least one processor and/or the temperature controller are configured for adjusting settings of the shaft seal vent and/or the machine.

3. The system of claim 1, wherein the at least one processor and/or the temperature controller are configured for adjusting a shaft seal vent valve.

4. The system of claim 1, wherein the at least one processor includes or is in communication with a pressure controller.

5. The system of claim 1, wherein the machine includes a labyrinth seal.

6. The system of claim 1, wherein the machine incudes a second end.

7. The system of claim 1, wherein a temperature sensor is positioned proximate to the shaft seal vent.

8. The system of claim 1, wherein the system includes a flow controller and wherein the flow controller detects the process gas flow through the shaft seal vent based on a rate of flow of the vent gas flow at the shaft seal vent.

9. The system of claim 8, wherein the flow controller provides cascade control of the shaft seal vent and/or of the machine.

10. The system of claim 1, wherein the at least one processor, the temperature controller, and/or a flow controller are configured to determine a characteristic of the process gas flow through the shaft seal vent.

11. A method, comprising:
providing a sealing gas system, including a machine having a first end, a bearing carrier, a shaft seal vent, and at least one processor, wherein the at least one processor includes or is in communication with a temperature controller;
providing a sealing gas flow to the bearing carrier;
detecting a temperature of a vent gas flow from the shaft seal vent; and
determining a process gas flow through the shaft seal vent based on the detected temperature of the vent gas flow from the shaft seal vent.

12. The method of claim 11, further comprising:
adjusting settings of the shaft seal vent and/or the machine based on the determined process gas flow through the shaft seal vent.

13. The method of claim 11, further comprising:
adjusting a shaft seal vent valve based on the determined process gas flow through the shaft seal vent.

14. The method of claim 11, further comprising:
determining a characteristic of the process gas flow through the shaft seal vent.

15. The method of claim 14, further comprising:
adjusting the characteristic of the process gas flow through the shaft seal vent.

16. The method of claim 11, further comprising detecting a rate of flow of vent gas from the shaft seal vent, wherein determining the process gas flow through the shaft seal vent is based on the detected temperature of the vent gas flow from the shaft seal vent and the detected rate of flow of vent gas from the shaft seal vent.

17. The method of claim 16, further comprising adjusting settings of the shaft seal vent and/or the machine based on the detected rate of flow of vent gas from the shaft seal vent.

18. A computer program product, comprising a computer readable hardware storage device storing a computer readable program code, the computer readable program code comprising an algorithm that when executed by at least one computer processor of a computing system implements a method comprising:
detecting a temperature of a vent gas flow from a shaft seal vent of a machine; and
determining a process gas flow through the shaft seal vent based on the detected temperature of the vent gas flow from the shaft seal vent.

19. The computer program product of claim 16, further comprising:
adjusting settings of the shaft seal vent, adjusting a shaft seal vent valve, and/or adjusting the machine based on the determination of the process gas flow through the shaft seal vent.

20. The computer program product of claim 16, further comprising:
detecting a rate of flow of the vent gas flow from the shaft seal vent of the machine; and
determining the process gas flow through the shaft seal vent based on the detected temperature of the vent gas flow from the shaft seal vent and the detected rate of flow of the vent gas flow from the shaft seal vent.

\* \* \* \* \*